United States Patent
Kurihara

(10) Patent No.: US 10,757,275 B2
(45) Date of Patent: Aug. 25, 2020

(54) INFORMATION PROCESSING APPARATUS, METHOD OF CONTROLLING INFORMATION PROCESSING APPARATUS, AND PROGRAM

(71) Applicant: CANON KABUSHIKI KAISHA, Tokyo (JP)

(72) Inventor: Shukei Kurihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/362,428

(22) Filed: Mar. 22, 2019

(65) Prior Publication Data

US 2019/0306338 A1    Oct. 3, 2019

(30) Foreign Application Priority Data

Mar. 30, 2018  (JP) ................................ 2018-069283

(51) Int. Cl.
  *G06F 3/12*   (2006.01)
  *H04N 1/00*   (2006.01)
  *H04W 88/08*  (2009.01)

(52) U.S. Cl.
  CPC ....... *H04N 1/00334* (2013.01); *G06F 3/1203* (2013.01); *G06F 3/1236* (2013.01); *G06F 3/1292* (2013.01); *H04W 88/08* (2013.01)

(58) Field of Classification Search
  CPC .................. H04N 1/00334; G06F 3/1203
  See application file for complete search history.

(56) References Cited

U.S. PATENT DOCUMENTS

| | | | | |
|---|---|---|---|---|
| 2016/0274835 A1* | 9/2016 | Mihira | .................. | G06F 3/1204 |
| 2017/0127276 A1* | 5/2017 | Koo | ..................... | H04L 9/3226 |
| 2017/0238173 A1* | 8/2017 | Goto | ..................... | H04W 4/185 |
| | | | | 380/282 |
| 2017/0277496 A1* | 9/2017 | Mihira | .................. | G06F 3/1203 |

FOREIGN PATENT DOCUMENTS

WO    2011/132761 A1    10/2011

* cited by examiner

*Primary Examiner* — Ibrahim Siddo
(74) *Attorney, Agent, or Firm* — Canon U.S.A., Inc IP Division

(57) ABSTRACT

An information processing apparatus determines whether information extracted from a read two-dimensional code is first connection information about an access point of a network or second connection information for connecting to a communication apparatus. If the information processing apparatus determines that the extracted information is the first connection information, the information processing apparatus connects to the network via the access point corresponding to the first connection information, automatically searches for a plurality of communication apparatuses connected to the network, displays a list of the plurality of detected communication apparatuses, and connects to a communication apparatus selected from the displayed list. If the information processing apparatus determines that the extracted information is the second connection information, the information processing apparatus connects to the communication apparatus using the second connection information.

20 Claims, 9 Drawing Sheets

INFRASTRUCTURE CONNECTION

DIRECT CONNECTION

INFRASTRUCTURE CONNECTION

DIRECT CONNECTION

Company=AAA:IP=223.25.17.13:mac=009C02CE358E

QR CODE FOR INFRASTRUCTURE CONNECTION

Company=AAA:IP=192.168.0.1:mac=009C02CE358E:SSID=DIRECT-1F_AAA10:Key=0123456789

QR CODE FOR DIRECT CONNECTION

WIFI:S:Office_SSID_g;T:WPA2;P:0123456789;;

QR CODE FOR ACCESS POINT CONNECTION

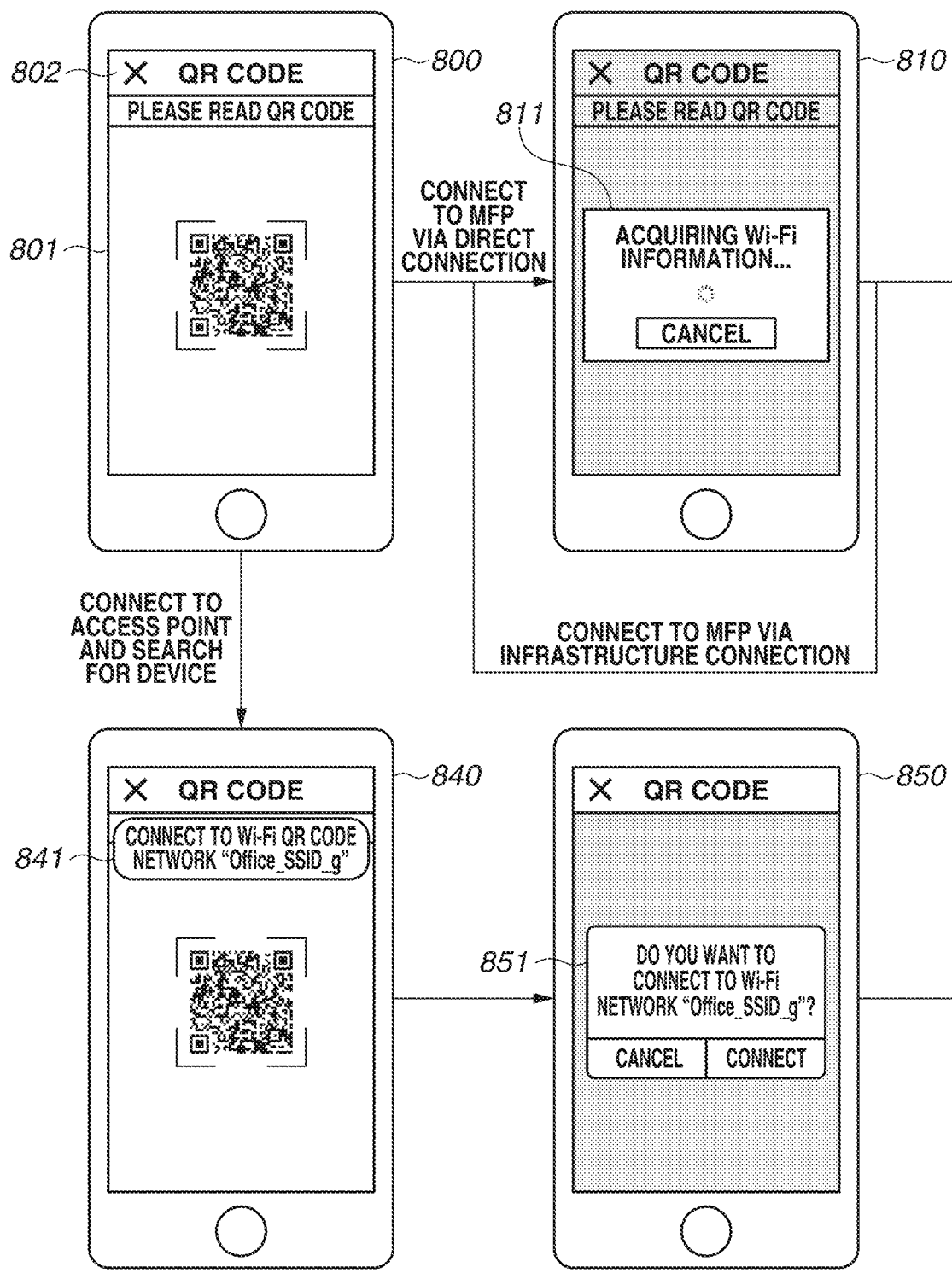

INFORMATION PROCESSING APPARATUS, METHOD OF CONTROLLING INFORMATION PROCESSING APPARATUS, AND PROGRAM

BACKGROUND

The present disclosure relates to a technique for performing communication connection based on information acquired by analyzing a two-dimensional code.

DESCRIPTION OF THE RELATED ART

There is a conventionally-known method in which an access point and a mobile terminal directly communicate with each other wirelessly. In order to wirelessly connect the mobile terminal to the access point, a user needs to input a service set identifier (SSID) and a pass key to the mobile terminal. As used herein, the SSID is access point identification information and the pass key is an encryption key.

There is a conventionally-known method in which an information processing apparatus displays a two-dimensional code for providing information indicating the SSID and pass key of an access point provided by the information processing apparatus so that the user does not have to input the SSID and pass key to a mobile terminal. The mobile terminal acquires the SSID and pass key of the access point by capturing and analyzing the two-dimensional code displayed on the information processing apparatus. The mobile terminal can wirelessly connect to the access point of the information processing apparatus based on the acquired SSID and pass key.

There is a conventionally-known method in which an information processing apparatus and an access point as an external apparatus separated from the information processing apparatus are connected via a network and a mobile terminal connects to the access point so that the information processing apparatus and the mobile terminal can communicate with each other.

WO 2011/132761 discusses a mobile terminal that includes an application configured to read a two-dimensional code and acquire communication information for connecting to an access point of an infrastructure (existing wireless local area network (LAN)).

If the technique discussed in WO 2011/132761 is used, communication can be established between the mobile terminal and the access point of the infrastructure and the mobile terminal can connect to a network via the access point. However, in order to connect an information processing terminal located on the network and the mobile terminal, a user needs to perform, on the mobile terminal, an operation to input the Internet Protocol (IP) address of the information processing apparatus, which is inconvenient for the user.

There is a case in which a Quick Response (QR) code for connecting to an access point of a wireless LAN is attached to a casing of an apparatus configured to operate as the access point. Also in this case, a mobile terminal can connect to the wireless LAN via the access point by reading the QR Code®, but in order to communicate with another apparatus connected to the wireless LAN, a user needs to perform an operation on the mobile terminal to input the IP address of the other apparatus.

SUMMARY

According to an aspect of the present invention, an information processing apparatus performs reading a two-dimensional code, determining whether information extracted from the read two-dimensional code is first connection information about an access point of a network or second connection information for connecting to a communication apparatus, connects to the network via the access point corresponding to the first connection information in a case where the determining determines that the extracted information is the first connection information, automatically searching for a plurality of communication apparatuses connected to the network to which the information processing apparatus connects via the access point corresponding to the first connection information, displaying a list of the plurality of searched-for communication apparatuses, connecting to a communication apparatus selected from the displayed list, and connecting to the communication apparatus using the second connection information in a case where the determining determines that the extracted information is the second connection information.

Further features will become apparent from the following description of exemplary embodiments with reference to the attached drawings.

BRIEF DESCRIPTION OF THE DRAWINGS

FIG. 8A-8B illustrates examples of a screen of the mobile terminal according to the first exemplary embodiment.

DESCRIPTION OF THE EMBODIMENTS

A first exemplary embodiment will be described below with reference to the drawings. The below-described exemplary embodiment is not seen to be limited, and not every combination of features described in the exemplary embodiment is always deemed to be essential.

Figure 1A:
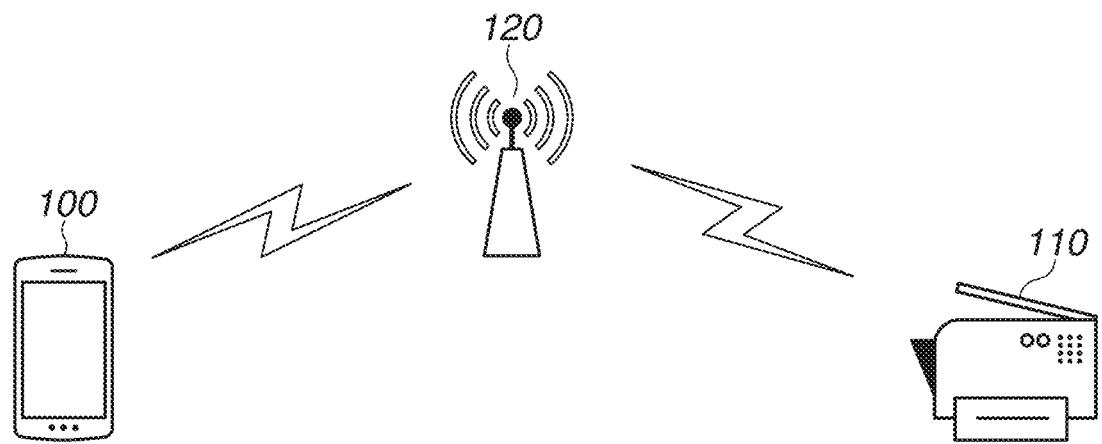
FIG. 1A illustrates a configuration of a communication system (infrastructure connection).

First, a configuration of a communication system will be described with reference to FIG. 1A for a case where a mobile terminal 100, as an information processing apparatus, and a multi-function peripheral (MFP) 110, as a communication apparatus, perform infrastructure connection. In the communication system illustrated in FIG. 1A, the mobile terminal 100 and the MFP 110 are connected to an access point 120 of an existing wireless local area network (LAN) (existing infrastructure). The mobile terminal 100 and the MFP 110 communicate with each other via the access point 120. While the MFP 110 is described as an example in the present exemplary embodiment, a single function printer (SFP) can be used in place of the MFP 110. Alternatively, the communication apparatus can be an apparatus other than an image forming apparatus such as a MFP or SFP. Hereinafter, the connecting of the mobile terminal 100 and the MFP 110 via the access point 120 of the existing wireless LAN will be referred to as "infrastructure connection".

Figure 1B:
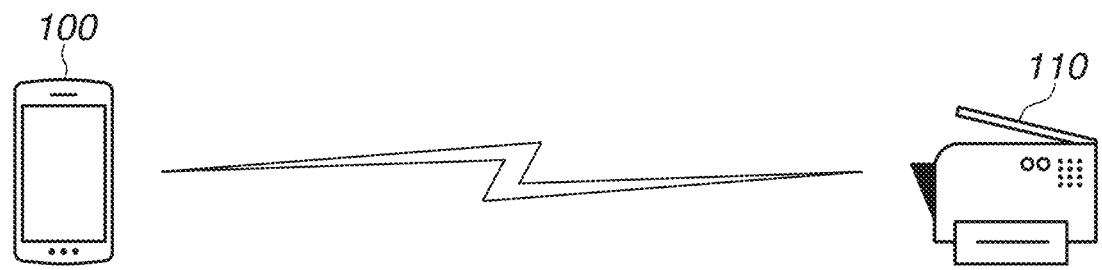
FIG. 1B illustrates a configuration of a communication system (direct connection).

Next, a different configuration of a communication system in a case in which the mobile terminal 100 and the MFP 110 are directly connected wirelessly will be described with reference to FIG. 1B. The communication system in FIG. 1B includes the mobile terminal 100 and the MFP 110. The MFP 110 operates as an access point and executes wireless communication, such as wireless communication via a LAN, with the mobile terminal 100. In this way, the mobile terminal 100 and the MFP 110 wirelessly communicate with each other without the access point 120. Hereinafter, the connecting of the mobile terminal 100 and the MFP 110 directly and wirelessly without the access point 120 will be referred to as "direct connection".

The mobile terminal 100 according to the present exemplary embodiment includes a function of reading code information (e.g., two-dimensional code) to acquire connection information which is used to communicably connect with another apparatus (hereinafter, sometimes referred to as "device"). A known example of a two-dimensional code is a QR Code®. Examples of a QR Code® for device connection will be described with reference to FIGS. 7A to 7C.

Figure 7A:
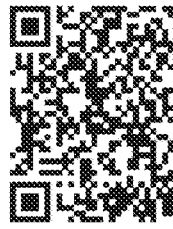
FIG. 7A illustrates an example of a two-dimensional code (for infrastructure connection).

FIG. 7A illustrates an example of a QR Code® for infrastructure connection. The mobile terminal 100 reads the QR Code® illustrated in FIG. 7A to acquire the IP address of the MFP 110 for connecting to the MFP 110 that is connected to the LAN via the access point 120. The QR Code® for infrastructure connection is displayed on, for example, an operation panel 206 of the MFP 110.

Figure 7B:
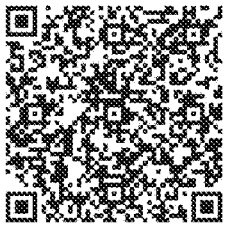
FIG. 7B illustrates an example of a two-dimensional code (for direct connection).

FIG. 7B illustrates an example of a QR Code® for direct connection. The mobile terminal 100 reads the QR Code® illustrated in FIG. 7B to acquire connection information such as the SSID and pass key of an access point activated in the MFP 110 and the IP address of the MFP 110. The QR Code® for direct connection is displayed on, for example, the operation panel 206 of the MFP 110.

Figure 7C:
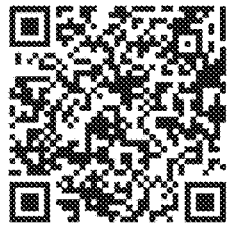
FIG. 7C illustrates an example of a two-dimensional code (for access point connection).

FIG. 7C illustrates an example of a QR Code® that is used to connect to the access point 120. The mobile terminal 100 reads the QR Code® illustrated in FIG. 7C to acquire connection information such as SSID, pass key, and authentication method for connecting to a device such as the access point 120, which is connected to the LAN. For example, the QR Code® for access point connection is attached to a casing of the access point 120, such that the QR Code® is readable by the mobile terminal 100. The location of the QR Code® for access point connection is not limited. For example, the mobile terminal 100 can read the QR Code® for infrastructure connection located on a sheet medium or presented on a display.

Figure 2:
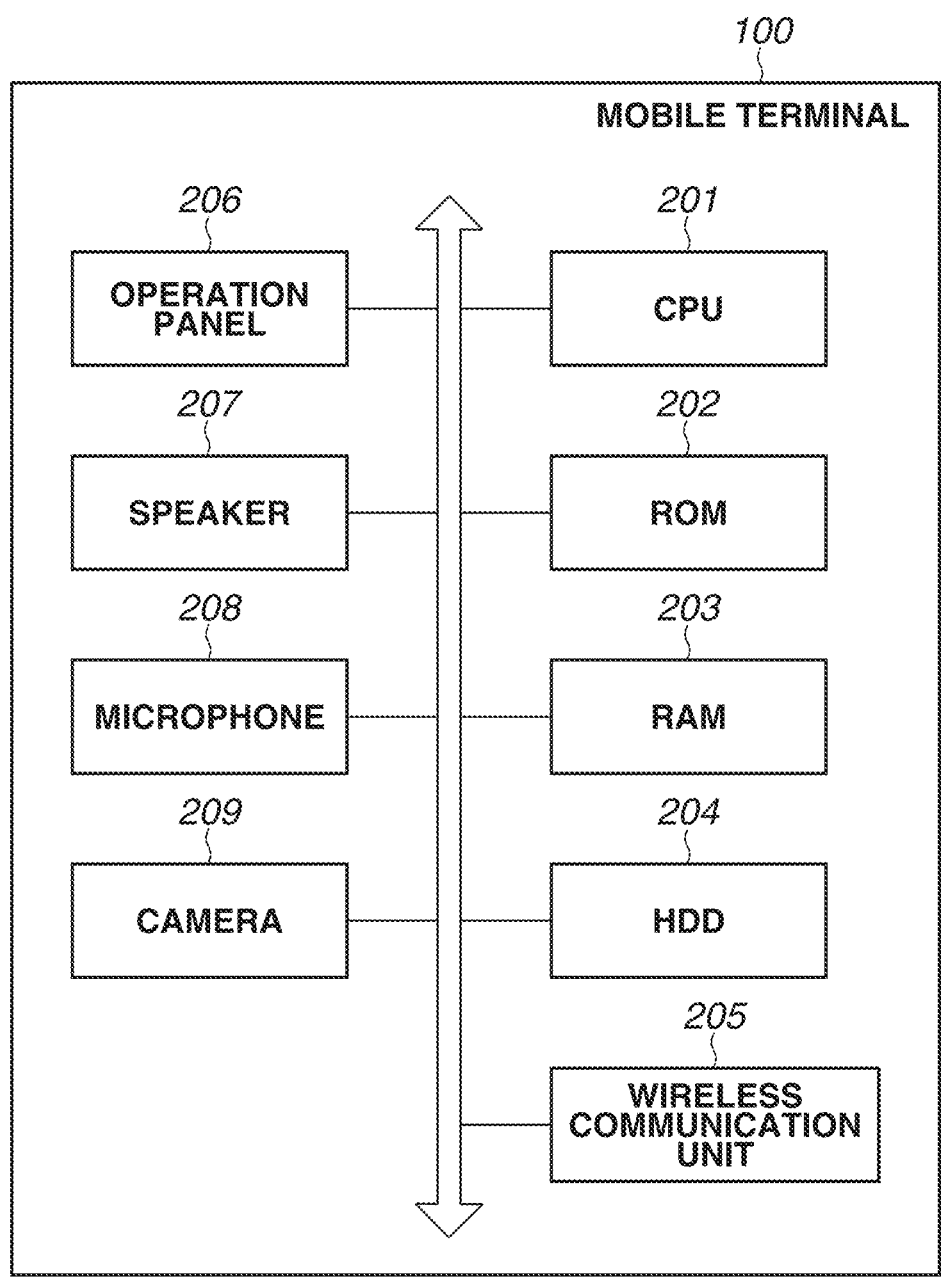
FIG. 2 illustrates a hardware configuration of a mobile terminal.

Next, a hardware configuration of the mobile terminal 100 will be described with reference to FIG. 2.

A central processing unit (CPU) 201 reads a control program stored in a read-only memory (ROM) 202 and executes processing for controlling an operation of the mobile terminal 100. The ROM 202 stores the control program. A random access memory (RAM) 203 is used as a temporary storage area such as a main memory of the CPU 201 and a work area. A hard disk drive (HDD) 204 stores data such as a captured image and electronic document. An operating system (OS) 310 and a MFP application 300 described below are also stored in the HDD 204.

While one CPU 201 executes processes illustrated in flowcharts described below in the case of the mobile terminal 100, a different implementation can be employed. For example, a plurality of CPUs can cooperate to execute the processes illustrated in the flowcharts.

The operation panel 206 includes a touch panel function whereby a user touch operation is detectable, and also functions as a display unit that displays various screens provided by the OS 310 and the MFP application 300. A user can input a desired operation instruction to the mobile terminal 100 by performing an operation such as touching the operation panel 206.

A speaker 207 and a microphone 208 are used when a user makes a phone call to another mobile terminal or fixed-line phone.

A camera 209 captures an image in response to an image capturing instruction from a user. The camera 209 according to the present exemplary embodiment reads a two-dimensional code. An image captured by the camera 209 is stored in a predetermined area of the HDD 204. A wireless communication unit 205 executes wireless communication such as wireless communication via the LAN.

Figure 3:
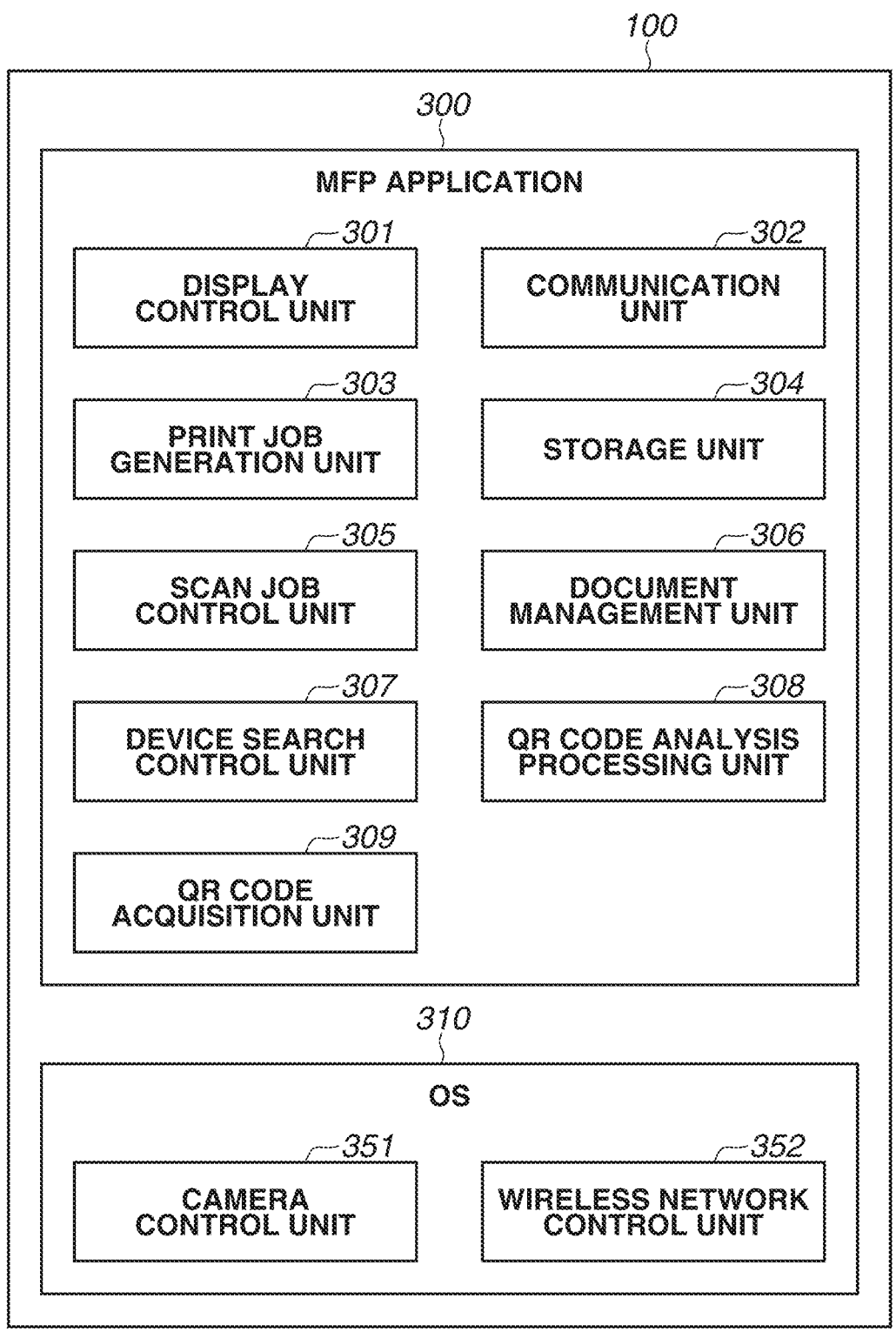
FIG. 3 illustrates a software configuration of the mobile terminal.

Next, a software configuration of the mobile terminal 100 will be described with reference to FIG. 3. FIG. 3 is a functional block diagram illustrating software that is realized by the CPU 201 reading the control program stored in the ROM 202 or the HDD 204.

The OS 310 is software for controlling an entire operation of the mobile terminal 100. Various applications including the MFP application 300 described below can be installed in the mobile terminal 100. The OS 310 exchanges information with the applications and changes a screen displayed on the operation panel 206 based on an instruction received from the applications. The OS 310 includes a device driver group for controlling various types of hardware and provides an application programming interface (API) for using the various types of hardware to the applications running on the OS 310.

The device driver group according to the present exemplary embodiment includes a wireless network control unit 352. The wireless network control unit 352 is a device driver for controlling the wireless communication unit 205. A camera control unit 351 is a device driver for controlling the camera 209.

The MFP application 300 is an application installed in the mobile terminal 100. The MFP application 300 provides a function of performing an operation such as printing or scanning from a mobile terminal 100 side to the MFP 110.

A software configuration of the MFP application 300 will be described in further detail.

A display control unit 301 controls the screen displayed on the operation panel 206. The display control unit 301 displays an application screen on the operation panel 206. The display control unit 301 determines an operation instruction input by a user via the operation panel 206.

A communication unit 302 controls wireless communication performed by the wireless communication unit 205 via the wireless network control unit 352 of the OS 310 and transmits and receives a command.

A QR Code® acquisition unit 309 acquires a QR Code® captured by a user via the camera control unit 351 of the OS 310.

A QR Code® analysis processing unit 308 analyzes the QR Code® acquired by the QR Code® acquisition unit 309 and extracts connection information. The QR Code® analysis processing unit 308 acquires connection information for communicably connecting with another apparatus (the MFP 110 or the access point 120) based on a two-dimensional code read by the camera 209.

A device search control unit 307 searches for a device based on the connection information extracted by the QR Code® analysis processing unit 308.

A print job generation unit 303 generates a print job. The print job generated by the print job generation unit 303 is transmitted to the MFP 110 by the wireless communication unit 205. The MFP 110 executes printing based on the received print job. A storage unit 304 temporarily stores information used for operating the applications.

A scan job control unit 305 instructs the MFP 110 to perform a scan via the wireless communication unit 205 and displays scan data received from the MFP 110. The scan data is stored in the storage unit 304. The stored scan data is managed by a document management unit 306.

Figure 4:
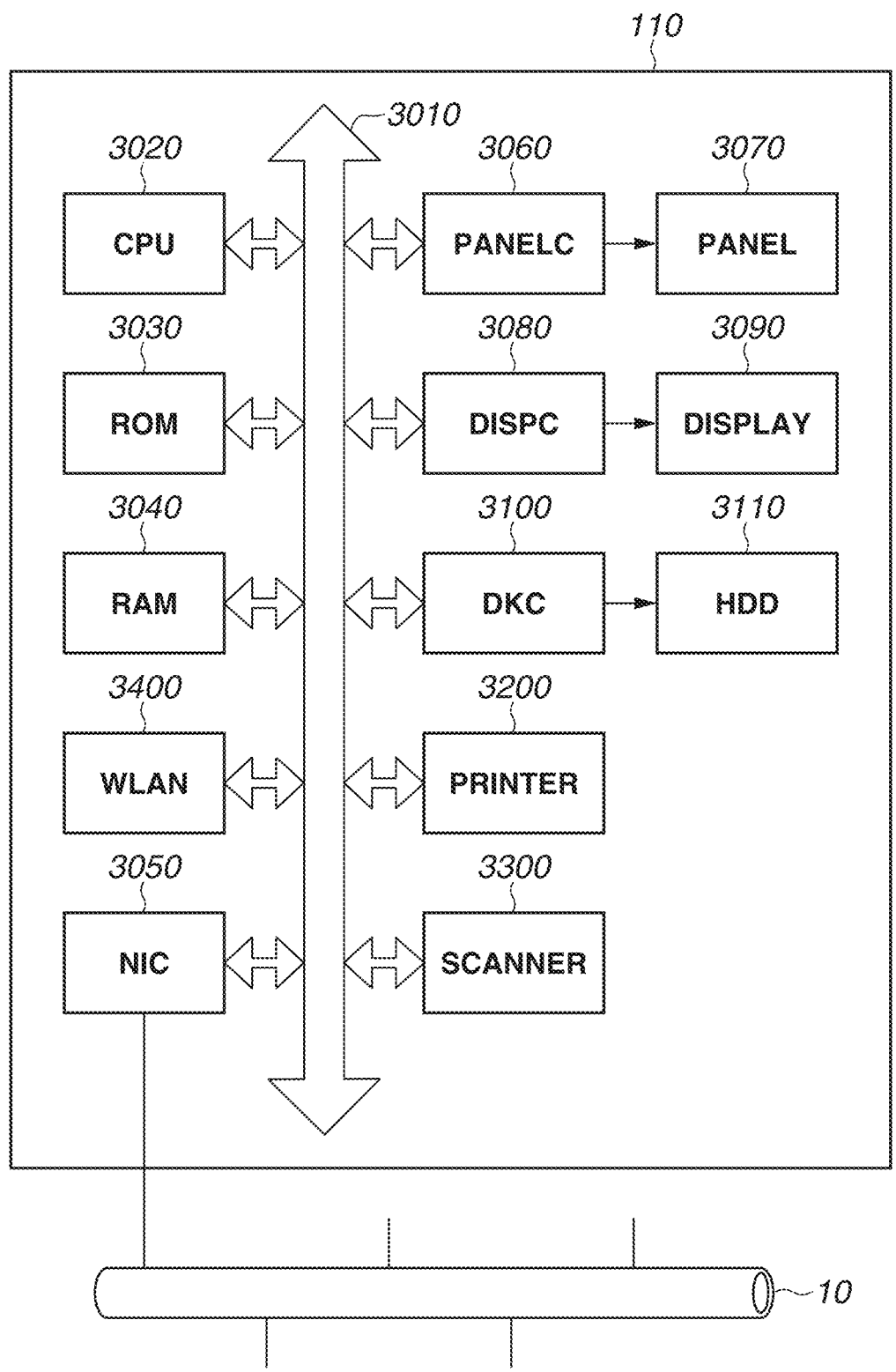
FIG. 4 illustrates a hardware configuration of a multi-function peripheral (MFP).

A configuration of the MFP 110 according to the present exemplary embodiment will be described with reference to FIG. 4.

The MFP 110 includes a CPU 3020 configured to execute software stored in a ROM 3030 or a HDD 3110, for example, and the CPU 3020 comprehensively controls each device connected to a system bus 3010.

A RAM 3040 functions as a main memory of the CPU 3020 and a work area. An external input controller (PANELC) 3060 controls input of an instruction from various buttons of the MFP 110 or a touch panel (PANEL) 3070. A display controller (DISPC) 3080 controls a display on a display module (DISPLAY) 3090 including a liquid crystal display, for example. A disk controller 3100 controls the HDD 3110.

A network interface card (NIC) 3050 bi-directionally exchanges data with another network device or file server via a network 10. A wireless communication module (WLAN) 3400 performs processing for connecting to an access point. The wireless communication module 3400 performs processing for connecting directly to the mobile terminal 100 in the case where the MFP 110 operates as an access point.

A printing unit (PRINTER) 3200 performs printing. The printing is realized by, for example, an electrophotographic method. The printing method is not limited to the electrophotographic method and can be an inkjet method. An image reading unit (SCANNER) 3300 performs processing for reading an image printed on a recording medium such as a sheet.

Figure 5:
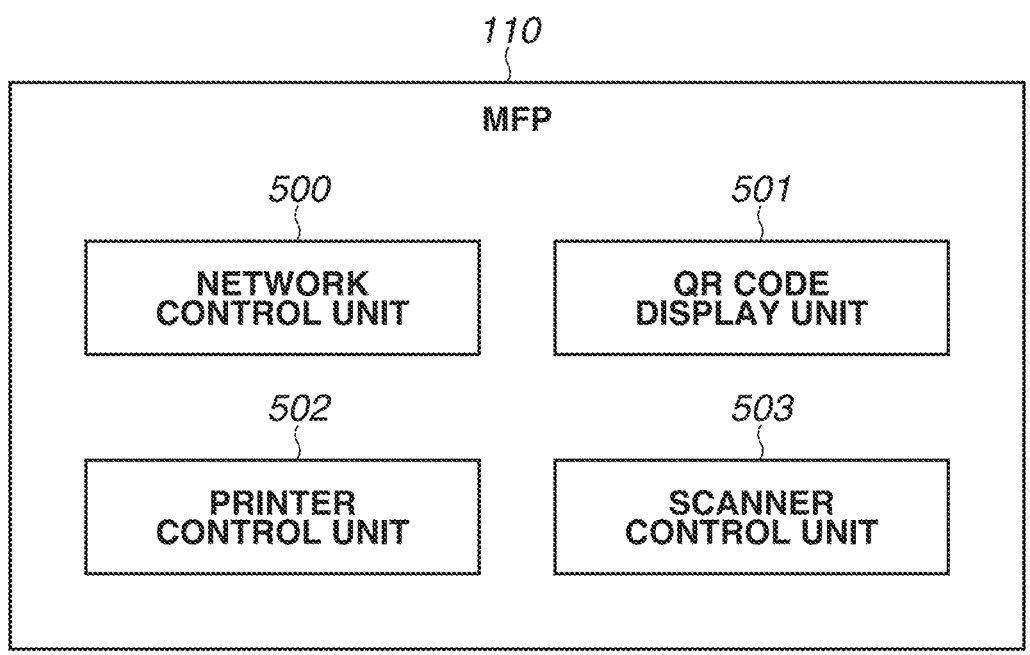
FIG. 5 illustrates a software configuration of the MFP.

A software configuration of the MFP 110 will be described with reference to FIG. 5. Each unit of software illustrated in FIG. 5 is stored in the ROM 3030 and executed by the CPU 3020.

A network control unit 500 controls the Network Interface Card (NIC) 3050. A QR Code® display unit 501 acquires connection information set by the network control unit 500, generates a QR Code® from the acquired connection information, and displays the generated QR Code® on the operation panel 206. A printer control unit 502 controls the printing unit 3200. A scanner control unit 503 controls the image reading unit 3300.

Figure 8B:
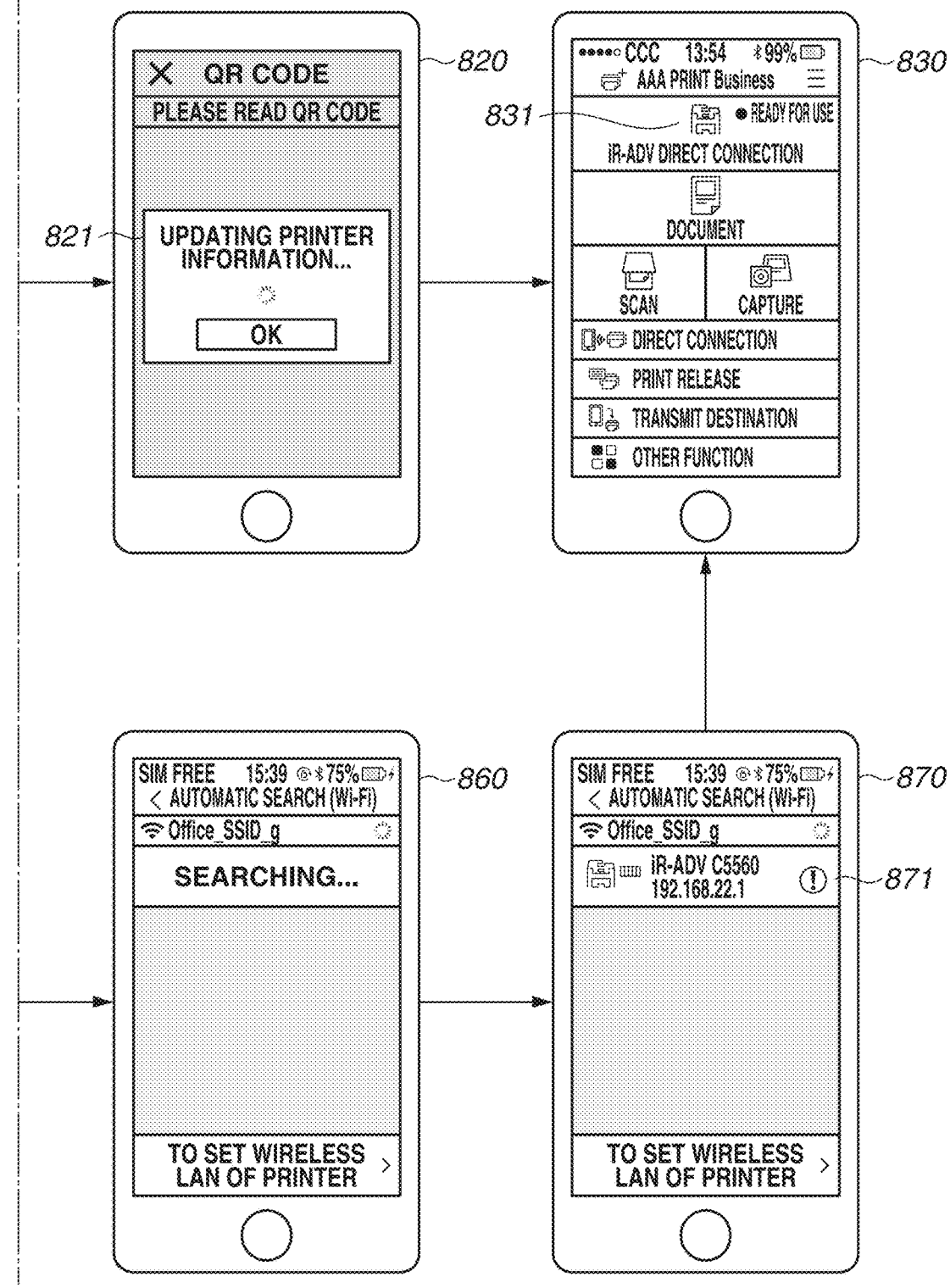

Next, the screens displayed on the operation panel 206 of the mobile terminal 100 will be described with reference to FIG. 8A-8B. Each screen illustrated in FIG. 8A-8B is displayed on the operation panel 206 based on the control by the display control unit 301. QR Code® reading processing is realized based on the control by the QR Code® acquisition unit 309.

A QR Code® reading screen 800 is a screen that is used to capture an image of a QR Code® displayed on the operation panel 206 of the MFP 110 using the camera 209. If a user of the mobile terminal 100 activates the MFP application 300 and inputs a QR Code® reading instruction, the MFP application 300 displays the QR Code® reading screen 800.

An image capturing area screen 801 is an area for displaying an image being captured by the camera 209. The image capturing area screen 801 displays a guide frame for positioning the QR Code®. If the mobile terminal 100 successfully reads the QR Code®, the QR Code® image capturing processing by the camera 209 ends. If a user presses a cancel button 402, the QR Code® acquisition unit 309 stops reading the QR Code® and returns to the previous screen.

The QR Code® analysis processing unit 308 analyzes information read from the QR Code®. As a result of the analysis, if the information read from the QR Code® is connection information for direct connection, the screen is changed to a screen 810. If the information read from the QR Code® is connection information for infrastructure connection, the screen is changed to a screen 820. If the information read from the QR Code® is connection information about an access point that is used by the mobile terminal 100 to connect to a network, the screen is changed to a screen 840. The connection information about the access point that is used by the mobile terminal 100 to connect to the network is different from the access point provided by the MFP 110. Hereinafter, for convenience, the connection information about the access point for connecting to the network will sometimes be referred to simply as "connection information for access point connection" or "connection information for connecting to the access point".

Whether the connection information read from the QR Code® is connection information for direct connection, connection information for infrastructure connection, or connection information for access point connection can be determined based on, for example, whether the read connection information has a predetermined format. As used herein, the connection information format refers to, for example, a format in which a single or plurality of types of information such as an IP address, SSID, and MAC address is described in a predetermined order or a format regarding the types of information described as connection information.

For example, in a case where the read connection information contains predetermined identification information such as a predetermined company name as illustrated in FIGS. 7A and 7B, the QR Code® analysis processing unit 308 can determine that the connection information is either connection information for infrastructure connection or connection information for direct connection. In the examples illustrated in FIGS. 7A and 7B, in the case where AAA is described as the company name (Company), the QR Code® analysis processing unit 308 can determine that the connection information is either connection information for infrastructure connection or connection information for direct connection. In a case where the read connection information contains identification information, such as a predetermined company name, and contains predetermined information (character string) such as "DIRECT" indicating that the connection information is connection information for direct connection, the QR Code® analysis processing unit 308 determines that the connection information is connection information for direct connection. In a case where the read connection information contains identification information, such as a predetermined company name, and contains SSID/pass key information, the QR Code® analysis processing unit 308 can determine that the connection information is connection information for direct connection. In a case where the read connection information contains identification information, such as a predetermined company name, but does not contain SSID/pass key information, the QR Code® analysis processing unit 308 can determine that the connection information is connection information for infrastructure connection. In a case where the read connection information contains identification information, such as a predetermined company name, but does not contain predetermined information indicating that the connection information is information for direct connection, the QR Code® analysis processing unit 308 can determine that the connection information is information for infrastructure connection.

In a case where the read connection information contains predetermined information (character string) such as "WIFI" as illustrated in FIG. 7C, the QR Code® analysis processing unit 308 can determine that the connection information is information for access point connection. In a case where the read communication information does not contain an IP address, the QR Code® analysis processing unit 308 can determine that the connection information is information for connecting to the access point. The method for determining the type of the connection information is not limited to the above-described method, and any other method can be used to determine the type.

Returning to the description of the display screens, the screen 810 is displayed on an operation unit in the case where the information read from the QR Code® is connection information for direct connection. The wireless communication unit 205 connects to the access point activated in the MFP 110 using the connection information (SSID, pass key) read from the QR Code®. Then, the wireless communication unit 205 acquires connection information for Wi-Fi® connecting to the MFP 110 from the MFP 110. A dialog 811 is a display for notifying the user that the connection information for Wi-Fi® connection is being acquired from the MFP 110.

The screen 820 is a screen that is displayed during a search for the MFP 110 using the IP address contained in the connection information. The device search control unit 307 searches for the MFP 110 that is specified by the IP address contained in the connection information when a connection is established with the access point activated in the MFP 110 or after a connection is established with the access point 120 of the infrastructure under control of the communication unit 302. If the MFP 110 that is specified by the IP address contained in the connection information is detected, the communication unit 302 establishes a communication connection with the MFP 110. If the communication is established with the MFP 110, the display control unit 301 displays a screen 830 on the operation panel 206.

The screen 830 is a top screen of the MFP application 300. An icon 831 is displayed on the screen as information containing the identification information specifying the detected MFP 110. The user of the mobile terminal 100 can instruct the MFP 110 to print a predetermined image or set a transmission destination of an image via the screen of the MFP application 300.

Next, the screen 840 will be described that is displayed in the case where the connection information is determined as information for connecting to the access point (access point for connecting to the network) as a result of the analysis by the QR Code® analysis processing unit 308.

A dialog 841 is displayed on the screen 840. The dialog 841 notifies the information that specifies a connection destination specified by the connection information read from the QR Code®. For example, the dialog 841 notifies information that specifies the SSID of the connection destination device. The dialog 841 notifies the information from which a user can recognize that the connection destination is different from the MFP 110 or the access point provided by the MFP 110. For example, the dialog 841 notifies a character string such as "Wi-Fi QR code" to inform the user that the connection destination is different from the MFP 110 or the access point provided by the MFP 110. While the example in which the dialog 841 provides a notification is described in the present exemplary embodiment, the notification is not limited to the dialog notification and can be provided by changing to another screen and providing a notification on the changed screen If a user performs a touch operation on the dialog 841, the display control unit 301 displays a screen 850. The screen 850 displays a dialog 851 to ask the user whether to enable a connection to the connection destination specified by the QR Code®. If a user operation to enable the connection is received via the dialog 851 (i.e. the button "CONNECT" is selected), the communication unit 302 starts a Wi-Fi® connection with the connection destination device (access point) specified by the connection information read from the QR Code® based on the connection information. If the connection is started, the device search control unit 307 searches for a device (e.g., image forming apparatus) located on the LAN connected to the mobile terminal 100 via the connection destination device. The device search control unit 307 transmits a search command to the connected LAN and detects a device on the LAN based on a response to the command. The search command is, for example, a command for receiving a response from a device that is located on the LAN and can provide a predetermined service. For example, in a case where a search command for searching for a device having an image forming function is transmitted, a device located on the LAN and having the image forming function, such as a printer, responds to the search command transmission source with information containing identification information and connection information about the device. The response contains connection information, such as the IP address, for connecting to the device that transmits the response. For example, a service such as web services dynamic discovery (WS-Discovery) or multicast domain name system (mDNS) can be used as a search service, but the search method is not limited to any specific method.

If a user operation to not enable the connection is received via the dialog 851 (i.e. the button "CANCEL" is selected), the display control unit 301 returns the screen display to the screen 801.

A screen 860 is a screen for notifying a user that a search for a device located on the LAN connected to the mobile terminal 100 is being executed. If a device is detected, the display control unit 301 displays a screen 870. The screen 870 is a screen for notifying the user of the device search result. A list of a single or plurality of devices detected on the LAN is displayed as a result of an automatic search. The user can select a device to which the mobile terminal 100 is to connect, from the identification information about the single or plurality of displayed devices. If a device is selected, the communication unit 302 performs processing to establish a communication connection with the device based on the connection information contained in the response from the selected device.

If the connection with the device selected by the user is successfully established, the display control unit 301 changes the display screen to the screen 830, which is the top screen of the MFP application 300. The screen 830 displays the icon 831 as information containing the identification information about the connected device.

Figure 6:
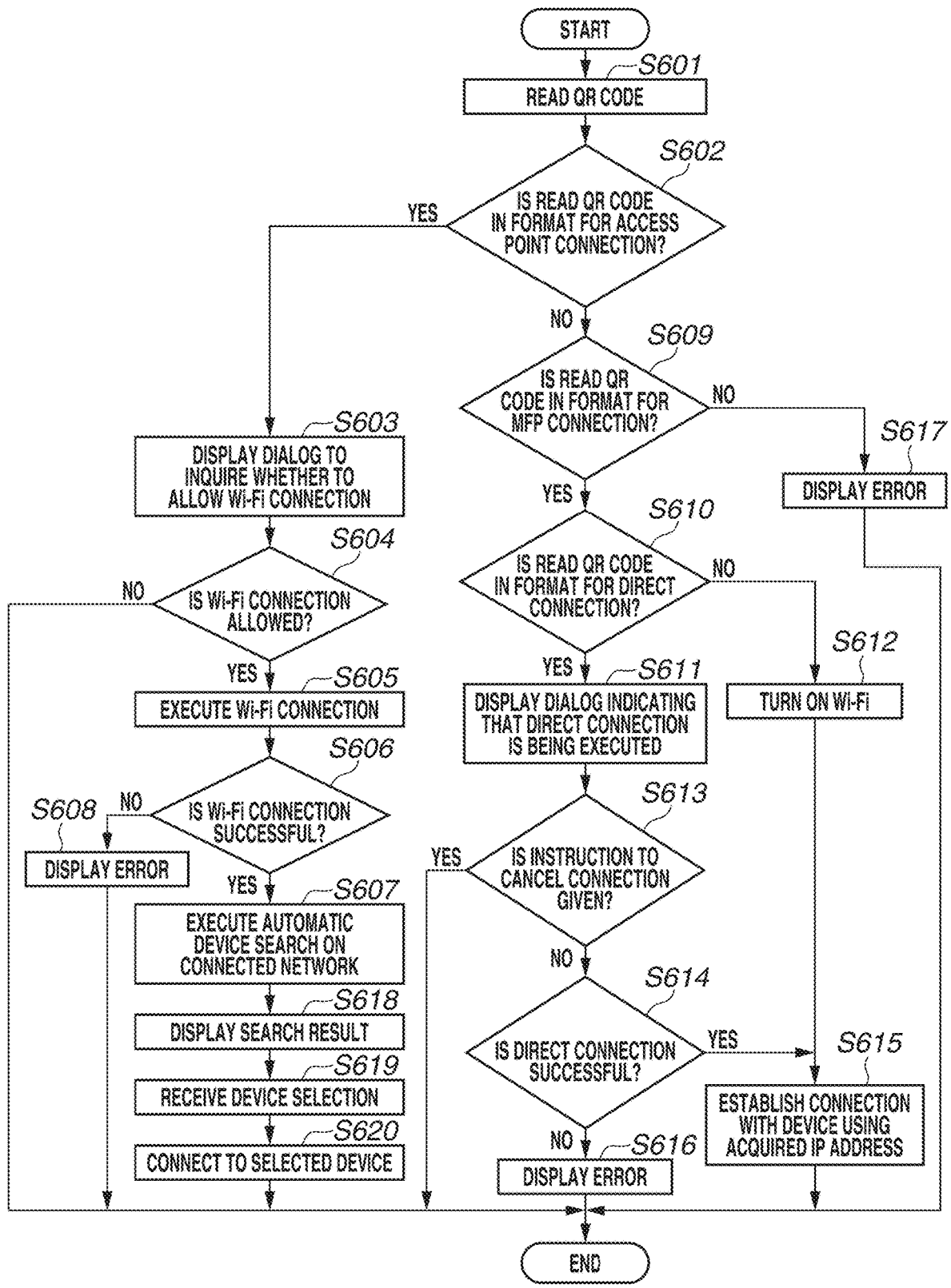
FIG. 6 is a flowchart illustrating a communication connection process according to a first exemplary embodiment.

Next, a process in which the mobile terminal 100 establishes communication with the MFP 110 using a QR Code® will be described below with reference to a flowchart illustrated in FIG. 6. The CPU 201 loads a process according to a program stored in a memory such as the ROM 202 and executes the process to process each step illustrated in the flowchart in FIG. 6.

In step S601, the QR Code® acquisition unit 309 reads a QR Code® captured by the camera 209 and extracts information as a character string.

Next, in step S602, the QR Code® analysis processing unit 308 determines whether the information extracted from the read QR Code® is connection information for access point connection for connecting to the network. As described above, the QR Code® analysis processing unit 308 can determine that the extracted information is connection information for access point connection if the connection information contains predetermined information (character string) such as "WIFI" as illustrated in FIG. 7C. The QR Code® analysis processing unit 308 can make the determination based on whether the character string "WIFI" is described at the beginning of the connection information.

If the QR Code® analysis processing unit 308 determines that the information extracted from the QR Code® is connection information for access point connection (YES in step S602), the processing proceeds to step S603. If the QR Code® analysis processing unit 308 determines that the extracted information is not connection information for access point connection (NO in step S602), the processing proceeds to step S609.

In step S603, the display control unit 301 displays the dialog 851 to ask the user whether to enable a Wi-Fi® connection using the connection information (for access point connection) extracted from the QR Code®.

Then, in step S604, the display control unit 301 determines whether the button "CONNECT" is selected. If the user selects the button "CONNECT" (YES in step S604), the processing proceeds to step S605. If the user selects the button "CANCEL" (NO in step S604), the process is ended.

In step S605, the communication unit 302 Wi-Fi® connects to the access point based on the connection information acquired from the QR Code®.

In step S606, the communication unit 302 determines whether the Wi-Fi® connection processing is successful. If the Wi-Fi® connection processing is successful (YES in step S606), the processing proceeds to step S607. If the Wi-Fi® connection processing is not successful (NO in step S606), the processing proceeds to step S608. In step S608, the display control unit 301 displays an error, and the process ends.

In step S607, the device search control unit 307 executes an automatic search on the connected LAN. Specifically, in the case in which the connection information extracted from the QR Code® is determined to be connection information for access point connection, the device search control unit 307 transmits a search command to the network connected via the access point specified by the connection information. The search command is a command for searching for a communication apparatus (e.g., MFP 110) connected to the network.

Examples of the search command include an instruction to request a response from a device that can provide a predetermined service (e.g., print function, scan function). For example, in a case in which a command for searching for a device having the image forming function is transmitted, a device located on the LAN and having the image forming function, such as a printer, responds to the search command transmission source with information containing identification information about the device, and connection information.

Alternatively, the mobile terminal 100 can request a response from a device having specific identification information, such as identification information about the manufacturer of the device, using a search command. For example, in a case in which a search command for searching for a device having the identifier of a specific manufacturer is transmitted, a device located on the LAN and having identification information indicating the manufacturer of the device can respond to the search command transmission source.

In step S618, the display control unit 301 performs display control to display an identification information list of the single or plurality of devices (communication apparatus) from which a response has been transmitted, on the screen as a search result.

In the case in which the acquired connection information is access point connection information for connecting to the network as described above, if a connection is established with the access point based on the connection information, control is performed to search for a communication apparatus connected to the network.

The user selects a device to which the mobile terminal 100 is to be connected, from the single or plurality of displayed devices, and instructs the mobile terminal 100 to connect to the selected device. The instruction is an instruction to select a communication apparatus to which the mobile terminal 100 is to connect via the access point. The display control unit 301 functions as a reception unit that receives the selection of a communication apparatus to which the mobile terminal 100 is to connect. In step S619, if the device selection by the user is received, then in step S620, the communication unit 302 connects to the selected device (e.g., MFP 110). The communication unit 302 connects to the selected device via the connected access point. At this time, connection information such as an IP address transmitted from the device as a response to the search command is used. In this way, the mobile terminal 100 establishes an infrastructure connection with the user-selected device.

Next, a process (step S609 and subsequent steps) in the case in which the QR Code® analysis processing unit 308 determines that the connection information read from the QR Code® is not connection information for access point connection in step S602 will be described.

In step S609, the QR Code® analysis processing unit 308 determines whether the extracted information is connection information for infrastructure connection with the MFP 110 as the specific communication apparatus or connection information for direct connection with the MFP 110. For example, if the extracted information contains the character string "AAA" as the company name, the QR Code® analysis processing unit 308 can determine that the information is either connection information for infrastructure connection with the MFP 110 or connection information for direct connection with the MFP 110. Hereinafter, connection information for infrastructure connection and connection information for direct connection are sometimes collectively referred to as connection information for MFP connection.

In step S609, if the QR Code® analysis processing unit 308 determines that the extracted information is neither connection information for infrastructure connection nor connection information for direct connection (the extracted information is not connection information for MFP connection) (NO in step S609), then in step S617, the display control unit 301 displays an error on the mobile terminal 100. Then, the process ends.

In step S609, if the QR Code® analysis processing unit 308 determines that the extracted information is connection information for MFP connection (YES in step S609), the QR Code® analysis processing unit 308 executes step S610.

If the extracted information is in a format for MFP connection (YES in step S609), the processing proceeds to step S610. If the extracted information is not in a format for MFP connection (NO in step S609), then in step S617, an error is displayed, and the process ends.

In step S610, the QR Code® analysis processing unit 308 determines whether the connection information read from the QR Code® is connection information for direct connection. The QR Code® analysis processing unit 308 can determine that the read connection information is connection information for direct connection if the read connection information contains identification information, such as a predetermined company name, and predetermined information that indicates that the information is connection information for direct connection, such as "DIRECT".

In this way, the QR Code® analysis processing unit 308 can determine whether the acquired connection information is connection information for direct connection or connection information for infrastructure connection. The connection information for infrastructure connection is connection information for connecting to a specific communication apparatus via the access point. The connection information for direct connection is connection information for connecting to an access point provided by a specific communication apparatus (e.g., MFP 110).

If the connection information read from the QR Code® is connection information for direct connection (YES in step S610), the processing proceeds to step S611. If the read connection information is not connection information for direct connection (NO in step S610), the processing proceeds to step S612.

In step S612, the communication unit 302 enables a Wi-Fi® communication function of the mobile terminal 100, and the processing proceeds to step S615.

In step S615, the communication unit 302 establishes communication with the device using the IP address contained in the information acquired from the QR Code®. In this way, the mobile terminal 100 establishes an infrastructure connection with the MFP 110.

In step S611, the display control unit 301 displays the dialog 811, which indicates that a direct connection is being executed, on the display unit of the mobile terminal 100.

The dialog 811 displays the cancel button for cancelling the direct connection based on the control by the display control unit 301. In step S613, the display control unit 301 determines whether a cancel instruction is provided via the cancel button. If the button "cancel" is selected (YES in step S613), the direct connection processing ends.

If no cancel instruction is provided (NO in step S613), then in step S614, the CPU 201 determines whether the direct connection using the connection information acquired from the QR Code® is successful.

If the CPU 201 determines that the direct connection is unsuccessful (NO in step S614), the processing proceeds to step S616. Examples of the case in which the direct connection is unsuccessful include a case in which a timeout occurs without establishing communication. In step S616, an error is displayed, and the process ends.

If the connection to the access point provided by the MFP 110 is successful (YES in step S614), the processing proceeds to step S615, and communication with the MFP 110 via the connected access point is started. In this way, the mobile terminal 100 establishes a direct connection with the MFP 110.

According to the present exemplary embodiment, if a two-dimensional code captured by the camera 209 of the mobile terminal 100 is connection information for connecting to an access point different from the access point provided by the MFP 110, the mobile terminal 100 performs the below-described processing. Specifically, if the mobile terminal 100 connects to the access point using the acquired connection information, the mobile terminal 100 searches for a device located on a network connected via the access point. Then, the mobile terminal 100 provides a search result to the user.

With the above-described configuration, the user no longer needs to perform a device search operation on the mobile terminal 100 to search for a device on the network after the mobile terminal 100 connects to the access point.

If the mobile terminal 100 according to the present exemplary embodiment captures a two-dimensional code displayed on a device, the mobile terminal 100 performs connection processing (infrastructure connection or direct connection) to connect to the device. If the mobile terminal 100 captures a two-dimensional code for connecting to an access point different from the access point provided by the MFP 110, the mobile terminal 100 searches for a device on a network connected via the access point.

With the above-described configuration, the connection process is changeable automatically based on the content of the connection information acquired by reading the two-dimensional code. Specifically, the mobile terminal 100 performs connection processing using a connection method based on the result of the determination of the format of the connection information. The user only needs to capture the two-dimensional code and, consequently, the mobile terminal 100 executes connection processing using a connection process that is suitable for the connection form, which improves user convenience.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-069283, filed Mar. 30, 2018, which is hereby incorporated by reference herein in its entirety.

What is claimed is:

1. An information processing apparatus comprising:
   at least one memory that stores a program; and
   at least one processor that executes the program to perform:
   reading a two-dimensional code;
   determining whether information extracted from the read two-dimensional code is first connection information that includes connection information about an access point of a network and does not include any IP address or second connection information that includes an IP address for connecting to a communication apparatus;
   connecting to the network via the access point corresponding to the first connection information in a case where the determining determines that the extracted information is the first connection information;
   displaying a device selection screen including a message indicating that a search is in progress after establishing connection by the information processing apparatus to the access point corresponding to the first connection information and without receiving a user operation;
   broadcasting a search command for searching for a plurality of communication apparatuses configured to provide a specific service and capable of performing communication via the network provided by the access point after establishing connection by the information processing apparatus to the access point corresponding to the first connection information and without receiving a user operation;
   updating display such that a list of communication apparatuses found by performing a search based on a response to the search command is displayed on the device selection screen;
   connecting to a communication apparatus selected from the device selection screen; and
   connecting to the communication apparatus using the IP address in a case where the determining determines that the extracted information is the second connection information.

2. The information processing apparatus according to claim 1, wherein the search command is a command for searching for a communication apparatus that provides a predetermined function.

3. The information processing apparatus according to claim 1, wherein the search command is a command for searching for a communication apparatus that has predetermined identification information.

4. The information processing apparatus according to claim 1, wherein the first connection information is information for wirelessly connecting to the access point of the network.

5. The information processing apparatus according to claim 1, wherein the second connection information is information for directly and wirelessly connecting the information processing apparatus to the communication apparatus or information for connecting the information processing apparatus to the communication apparatus via the network.

6. The information processing apparatus according to claim 1, wherein in a case where the information extracted from the two-dimensional code has a predetermined format, the determining determines that the information extracted from the two-dimensional code is the first connection information about the access point of the network.

7. The information processing apparatus according to claim 1, wherein in a case where the information extracted from the two-dimensional code contains predetermined information, the determining determines that the information extracted from the two-dimensional code is the first connection information about the access point of the network.

8. The information processing apparatus according to claim 1, wherein the at least one processor executes the program to further perform:
   displaying an error in a case where the determining determines that the information extracted from the read two-dimensional code is neither the first connection information nor the second connection information.

9. A method of controlling an information processing apparatus, the method comprising:
   reading a two-dimensional code;
   determining whether information extracted from the read two-dimensional code is first connection information that includes connection information about an access point of a network and does not include any IP address or second connection information that includes an IP address for connecting to a communication apparatus;
   connecting to the network via the access point corresponding to the first connection information in a case where the determining determines that the extracted information is the first connection information;
   displaying a device selection screen including a message indicating that a search is in progress after establishing connection by the information processing apparatus to the access point corresponding to the first connection information and without receiving a user operation;
   broadcasting a search command for searching for a plurality of communication apparatuses configured to provide a specific service and capable of performing communication via the network provided by the access point after establishing connection by the information processing apparatus to the access point corresponding to the first connection information and without receiving a user operation;
   updating display such that a list of communication apparatuses found by performing a search based on a response to the search command is displayed on the device selection screen;
   connecting to a communication apparatus selected from the device selection screen; and
   connecting to the communication apparatus using the IP address in a case where the determining determines that the extracted information is the second connection information.

10. The method according to claim 9, wherein the search command is a command for searching for a communication apparatus that provides a predetermined function.

11. The method according to claim 9, wherein the search command is a command for searching for a communication apparatus that has predetermined identification information.

12. The method according to claim 9, wherein the first connection information is information for wirelessly connecting to the access point of the network.

13. The method according to claim 9, wherein the second connection information is information for directly and wirelessly connecting the information processing apparatus to the communication apparatus or information for connecting the information processing apparatus to the communication apparatus via the network.

14. The method according to claim 9, wherein in a case where the information extracted from the two-dimensional code has a predetermined format, the determining determines that the information extracted from the two-dimensional code is the first connection information about the access point of the network.

15. The method according to claim 9, wherein in a case where the information extracted from the two-dimensional code contains predetermined information, the determining determines that the information extracted from the two-dimensional code is the first connection information about the access point of the network.

16. The method according to claim 9, wherein the at least one processor executes the program to further perform:
displaying an error in a case where the determining determines that the information extracted from the read two-dimensional code is neither the first connection information nor the second connection information.

17. A non-transitory computer readable storage medium storing a program for causing a computer to execute a method, the method comprising:
reading a two-dimensional code;
determining whether information extracted from the read two-dimensional code is first connection information that includes connection information about an access point of a network and does not include any IP address or second connection information that includes an IP address for connecting to a communication apparatus;
connecting to the network via the access point corresponding to the first connection information in a case where the determining determines that the extracted information is the first connection information;
displaying a device selection screen including a message indicating that a search is in progress after establishing connection by the information processing apparatus to the access point corresponding to the first connection information and without receiving a user operation;
broadcasting a search command for searching for a plurality of communication apparatuses configured to provide a specific service and capable of performing communication via the network provided by the access point after establishing connection by the information processing apparatus to the access point corresponding to the first connection information and without receiving a user operation;
updating display such that a list communication apparatuses found by performing a search based on a response to the search command is displayed on the device selection screen;
connecting to a communication apparatus selected from the device selection screen; and
connecting to the communication apparatus using the IP address in a case where the determining determines that the extracted information is the second connection information.

18. A method of searching for a communication apparatus, the method comprising:
reading a two-dimensional code;
connecting, in a case where information obtained from the read two-dimensional code is first connection information that includes connection information about an access point of a network and does not include any IP address, to the network via the access point corresponding to first connection information;
displaying a device selection screen including a message indicating that a search is in progress after establishing connection by the information processing apparatus to the access point corresponding to the first connection information and without receiving a user operation;
broadcasting a search command for searching for a plurality of communication apparatuses configured to provide a specific service and capable of performing communication via the network provided by the access point after establishing connection by the information processing apparatus to the access point corresponding to the first connection information and without receiving a user operation;
updating display such that a list of communication apparatuses found by performing a search based on a response to the search command is displayed on the device selection screen; and
connecting to a communication apparatus selected from the device selection screen.

19. The method according to claim 18, wherein the search command is a command for searching for a communication apparatus that provides a printing function.

20. The method according to claim 19, wherein the search command is a command for searching for a communication apparatus that has a scanning service.

* * * * *